United States Patent
Mannan et al.

(10) Patent No.: US 9,532,198 B2
(45) Date of Patent: Dec. 27, 2016

(54) SYSTEM AND METHOD FOR INITIATING COMMUNICATION FROM ACTUAL, NOTIONAL, OR DISSOCIATED PREVIEWED IMAGES

(71) Applicant: Motorola Mobility LLC, Chicago, IL (US)

(72) Inventors: Azimul Mannan, Darjeeling (IN); Krishnan Raghavan, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/326,844

(22) Filed: Jul. 9, 2014

(65) Prior Publication Data
US 2016/0014577 A1 Jan. 14, 2016

(51) Int. Cl.
*H04B 1/00* (2006.01)
*H04W 4/16* (2009.01)
*H04M 1/725* (2006.01)
*H04M 1/2755* (2006.01)

(52) U.S. Cl.
CPC ........... *H04W 4/16* (2013.01); *H04M 1/72522* (2013.01); *H04M 1/2755* (2013.01); *H04M 2250/52* (2013.01)

(58) Field of Classification Search
CPC ............ H04W 4/06; H04W 4/16; H04W 4/18; H04W 4/14; H04W 4/22
USPC ............ 235/379; 382/379; 700/17; 345/633; 455/403, 412.1, 414.1, 432.2, 556.1, 455/556.2, 557, 566, 90.1
See application file for complete search history.

(56) References Cited

U.S. PATENT DOCUMENTS

| | | | |
|---|---|---|---|
| 8,620,019 B2 | 12/2013 | Tanigawa et al. | |
| 2008/0233999 A1* | 9/2008 | Willigenburg | 455/556.1 |
| 2010/0066751 A1* | 3/2010 | Ryu et al. | 345/581 |
| 2011/0312376 A1* | 12/2011 | Woo et al. | 455/556.1 |
| 2012/0134576 A1* | 5/2012 | Sharma et al. | 382/155 |
| 2013/0335314 A1 | 12/2013 | Chang et al. | |
| 2014/0055553 A1* | 2/2014 | Lee et al. | 348/14.07 |
| 2015/0087288 A1* | 3/2015 | Dharawat et al. | 455/419 |
| 2015/0302421 A1* | 10/2015 | Caton | G06Q 30/018 705/17 |

FOREIGN PATENT DOCUMENTS

| | | |
|---|---|---|
| EP | 1587014 A1 | 10/2005 |
| EP | 2030421 B1 | 2/2012 |
| WO | 2007148164 A1 | 12/2007 |

* cited by examiner

*Primary Examiner* — Jean Gelin
(74) *Attorney, Agent, or Firm* — Shumaker & Sieffert, P.A.

(57) ABSTRACT

A communication device includes a communication circuit, an imager, and one or more processors. One or more memory devices store one or more reference images. The one or more processors can receive an image being previewed by the imager and determine whether the image being previewed by the imager corresponds to a stored image of the one or more reference images. Where the image being previewed by the imager corresponds to the stored image, the one or more processors can determine a communication identifier associated with the stored image and initiate communication with a remote device using the communication identifier. Where the object is a plurality of objects, the one or more processors can initiate a group communication with remote devices corresponding to all or a subset of the plurality of objects.

18 Claims, 12 Drawing Sheets

SYSTEM AND METHOD FOR INITIATING COMMUNICATION FROM ACTUAL, NOTIONAL, OR DISSOCIATED PREVIEWED IMAGES

BACKGROUND

Technical Field

This disclosure relates generally to electronic devices, and more particularly to electronic devices with imagers.

Background Art

Portable electronic devices are continually becoming more advanced. Simple cellular telephones with 12-digit keypads have evolved into "smart" devices with sophisticated touch-sensitive screens. These smart devices are capable of not only making telephone calls, but also of sending and receiving text and multimedia messages, surfing the Internet, taking pictures, and watching videos, just to name a few of their many features. It would be advantageous to have methods and systems that made using such devices simpler.

Figure 1:
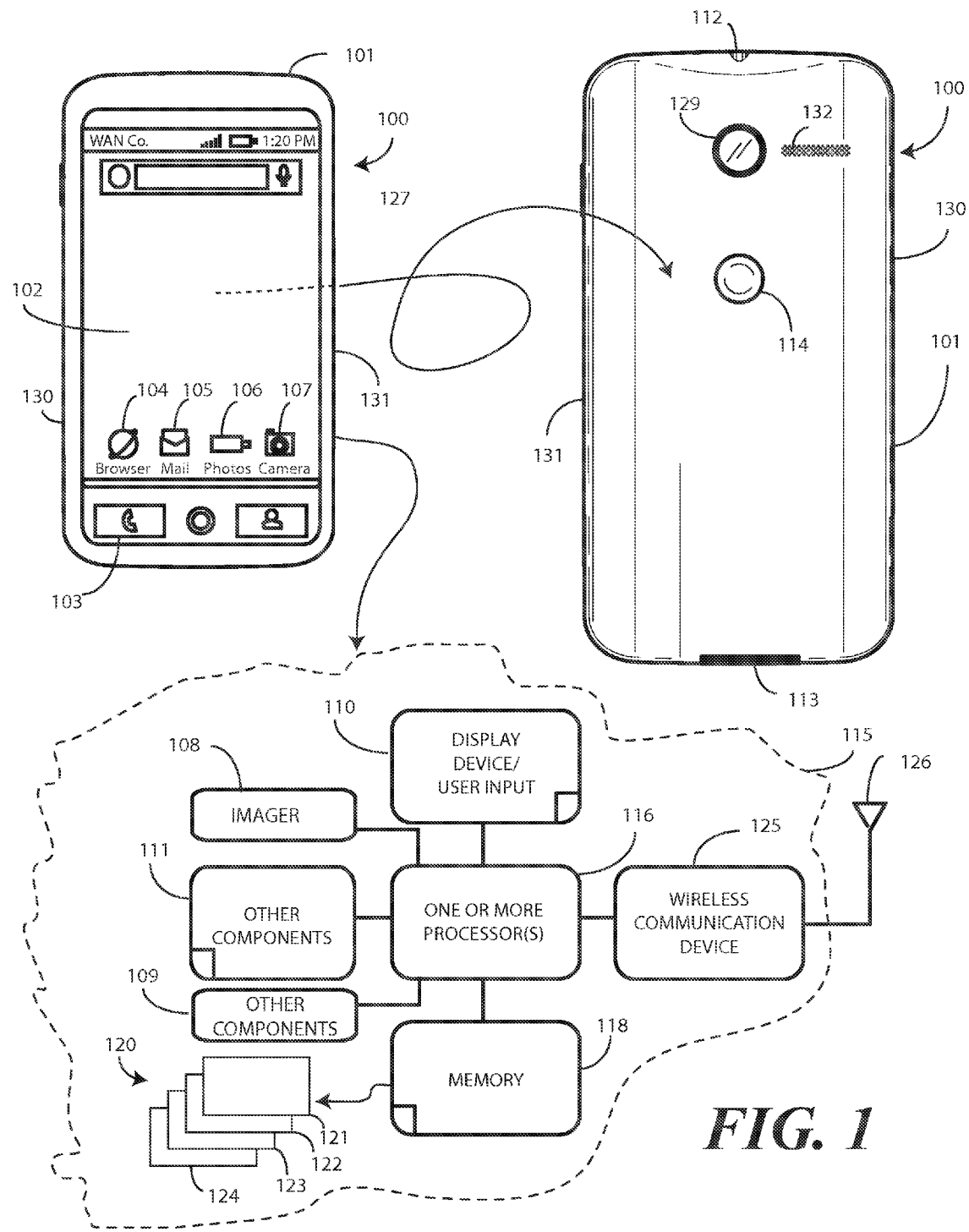
FIG. 1 illustrates one explanatory communication device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to previewing an image, determining whether the previewed image corresponds to a stored image, and where a match is found, initiating communication information using contact information associated with the stored image. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of initiating communication based upon a previewed image as described herein. The non-processor circuits may include, but are not limited to, a radio receiver, a radio transmitter, signal drivers, clock circuits, power source circuits, and user input devices. As such, these functions may be interpreted as steps of a method to perform the initiation of communication based upon a previewed image. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As noted above, electronic devices are becoming increasingly more sophisticated. A smart phone or tablet, for example, has more computing power than a desktop computer did a few years ago. Consumers are benefitting from this advanced in technology in two ways. This is true because just as the technology is becoming more advanced, the prices for smart devices are declining. Consequently, smart devices are available to new segments of the population who could previously not afford them. This includes people in developing countries who, until recently, may not have even had telephone service. All over the world, more and more people are gaining access to smart phones, tablets, palmtop computers, and the like. This is especially true in emerging markets where government subsidies and incentives further reduce the cost of the device.

For someone who has never used a telephone, learning to use a smart device can be intimidating. The difficulty is compounded if, for example, the person is unable to read. In remote rural areas, it can be difficult or impossible to find experienced technicians who can assist with training. Even where such technicians exist, the complexities of operating a smart device can seem overwhelming to a user who has never used such powerful computing devices.

Embodiments of the disclosure provide methods, devices, and systems to simplify the operation of making telephone calls and other electronic communications using electronic devices. While embodiments of the disclosure work particularly well with smart devices, it should be noted that they may also be used with conventional cellular telephones, messaging, and paging devices. Embodiments of the disclosure simplify the communication experience to such an extent that even first-time rural users, "non-tech savvy" users, children, and elderly users can simply and accurately initiate communication with third parties. Embodiments of the disclosure allow those new to electronic devices to easily make calls or send messages without any device specific training.

In one embodiment, a communication device includes a communication circuit, an imager, and one or more processors. One or more memory devices, operable with the one or more processors, include one or more reference images. In one embodiment, the reference images are thumbnail images having a reduced file size, thereby allowing the reference images to be stored in a very small amount of memory. In one embodiment, each reference image has associated therewith profile information with which the one or more processors can initiate communication with one or more remote devices.

In one embodiment, the one or more processors received a previewed image from the imager. It is not necessary for the imager to capture a picture; when the image is being previewed, it is delivered to the one or more processors, thereby additionally reducing the memory requirements of embodiments of the disclosure. The one or more processors receive the previewed image and determine whether the image being previewed corresponds to a stored reference image. Where the previewed image corresponds to a stored image, the one or more processors can determine a communication identifier associated with the stored image and initiate communication with a remote device using the communication identifier.

Thus, with embodiments of the disclosure, a rural farmer who has never used such a communication device can make telephone calls to family members simply by previewing an image of the family member with the imager. For example, presume that the farmer has a family portrait on the mantle. The family portrait includes a picture of the farmer's wife, parents, two sons, and daughter. When the farmer wants to call his mother, he simply points the communication device at the photograph so that his mother is the portion being previewed by the imager. The one or more processors of the communication device then reference contacts stored in memory to determine if those contacts include a photograph of the farmer's mother. Where they do, a "call" icon appears on the display of the communication device. In one embodiment, the farmer simply touches the icon and the call to his mother commences. In another embodiment, the farmer may deliver voice commands to the user interface, which serves as an equivalent of touch input, and the call to his mother commences.

Embodiments of the disclosure offer even more flexibility that that found in the previous example. For instance, embodiments of the disclosure contemplate that not everyone will have a family photo. Some may only have a change of clothes, a few utensils, a pot, and a small house. To accommodate such users, in one embodiment, images dissociated from the contacts to which they correspond can be used. As used herein, "dissociated" means disconnected or separate from the contact to which an object corresponds. Illustrating by example, presume a person only has a knife, a fork, a plate, and a window. Using embodiments of the disclosure, a communication device can be configured such that the fork, which is dissociated from the person's brother, for example, is used to initiate communication. Thus, when the person previews the fork with the imager of the communication device, the one or more processors correlate the previewed image of the fork with contact information for the brother. When previewing the fork, a call icon appears on the display of the communication device. The person simply touches the icon and the call to her brother commences.

In one embodiment, conference calls can be initiated using the methods and systems described below. Recall from above the farmer with his picture on the mantel. In one embodiment, the farmer can preview the picture with the imager of the communication device. The farmer then has the option to select, for example, one son and the daughter using touch input along the display. As the farmer touches these portions of the image, a highlight, circle, arrow, or other object appears to identify that these people have been selected. A call icon appears on the display as well. When the farmer touches the call icon, a conference call to the son and daughter is initiated. Advantageously, using embodiments of the disclosure, a person with no experience with a communication device can simply point the device at an object corresponding to a contact and make a call to one, two, three, or more third parties.

Turning now to FIG. 1, illustrated therein is one explanatory communication device 100 configured in accordance with one or more embodiments of the disclosure. The communication device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the communication device 100 could equally be a palm-top computer, a tablet computer, a gaming device, a media player, or other device.

This illustrative communication device 100 includes a display 102, which may optionally be touch-sensitive. In one embodiment where the display 102 is touch-sensitive, the display 102 can serve as a primary user interface of the communication device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

In one embodiment, the display 102 is an "always-on" display. This means that when the communication device 100 is in an active mode of operation, the display 102 is active and is presenting content to a user. However, when the communication device 100 is in a low-power or sleep mode, at least a portion of the display 102 is able to present persistent information. Illustrating by example, when the display 102 is an always-on display, and the communication device 100 is in a low-power or sleep mode, perhaps a quarter of the display 102 will present persistent information such as the time of day or a periodically previewed image from an imager, such as camera 129. Thus, when the display 102 is an always-on display, at least a portion of the display will be capable of presenting information to a user even when the communication device 100 is in a low-power or sleep mode.

The explanatory communication device 100 of FIG. 1 includes a housing 101. In one embodiment, the housing 101 includes two housing members. A front housing member 127 is disposed about the periphery of the display 102. Said differently, the display 102 is disposed along a front major face of the front housing member 127 in one embodiment. A rear-housing member 128 forms the backside of the communication device 100 in this illustrative embodiment and defines a rear major face of the electronic device. Features can be incorporated into the housing members 127,128. Examples of such features include an imager, shown as camera 129, or an optional speaker port 132. Each is shown disposed on the rear major face of the communication device 100 in this embodiment, but could also be disposed along the front major face. Additionally, imagers could be disposed on multiple faces, such as the front major face, rear major face, or any of the side faces. In this illustrative embodiment, a user interface component 114, which may be a button or touch sensitive surface, can also be disposed along the rear-housing member 128.

In one embodiment, the camera 129 is capable of both capturing images and previewing images. When images are captured, the captured image is recorded to memory 118. When images are previewed, the images are delivered to the one or more processors 116 for presentation on the display 102. However, when images are being previewed, in one embodiment there is no need to write the image to memory 118. Instead, electronic signals can be delivered from the camera 129 to the one or more processors 116 with only temporary buffering occurring in the one or more processors 116. Thus, previewed images do not consume non-volatile area in the memory 118, while captured images do.

In one embodiment, the communication device 100 includes one or more connectors 112,113, which can include an analog connector, a digital connector, or combinations thereof. In this illustrative embodiment, connector 112 is an analog connector disposed on a first edge, i.e., the top edge, of the communication device 100, while connector 113 is a digital connector disposed on a second edge opposite the first edge, which is the bottom edge in this embodiment.

A block diagram schematic 115 of the communication device 100 is also shown in FIG. 1. In one embodiment, the communication device 100 includes one or more processors 116. In one embodiment, the one or more control circuit can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the communication device 100. Each of the application processor and the auxiliary processor(s) can be configured to process and execute executable software code to perform the various functions of the communication device 100. A storage device, such as memory 118, can optionally store the executable software code used by the one or more processors 116 during operation.

In this illustrative embodiment, the communication device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the communication device 100. For example, in one embodiment the one or more processors 116 comprise one or more circuits operable to present presentation information, such as images, text, and video, on the display 102. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel, one or more drivers, and an application service layer 123, and an application layer 124. The operating system environment 121 can be configured as executable code operating on one or more processors or control circuits of the communication device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the communication device 100, an electronic mail application 105 configured to send and receive electronic mail, a photo application 106 configured to permit the user to view images or video on the display 102 of communication device 100, and a camera application 107 configured to capture still (and optionally video) images. These applications are illustrative only, as others will be obvious to one of ordinary skill in the art having the benefit of this disclosure. Additionally, others will be described in more detail below.

In one or more embodiments, the one or more processors 116 are responsible for managing the applications and all secure information of the communication device 100. The one or more processors 116 can also be responsible for launching, monitoring and killing the various applications and the various application service modules. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth. In one embodiment, as will be described in more detail below, the one or more processors 116 may generate commands based on information received from the imager, e.g., camera 129.

The one or more processors 116 can also be operable with other components 109. The other components 109, in one embodiment, include an acoustic detector 133. One example of an acoustic detector 133 is a microphone. The one or more processors 116 may process information from the other components 109 alone or in combination with other data, such as the information stored in the memory 118 or information received from the camera 129.

The communication device 100 can optionally include one or more proximity sensors 108 to detect the presence of nearby objects before those objects contact the communication device 100. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor. In one embodiment, the one or more proximity sensors 108 may detect, for example, that the communication device 100 is proximately located with a user's face and disable the display 102 to save power. In another example, when the one or more processors 116 determine that the communication device 100 is proximately located with a user's face, the one or more processors 116 may reduce the volume level of the speaker 132 so as not to over stimulate the user's eardrums.

Where proximity sensors 108 are included, a first set 122 of proximity sensor components can be disposed on the front major face of the communication device 100, while another set 123 of proximity sensor components can be disposed on the rear major face of the communication device 100. In one embodiment each set 122,123 of proximity sensor components comprises at least two proximity sensor components. For example, the first component can be one of a signal emitter or a signal receiver, while the second component is another of the signal emitter or the signal receiver. Each proximity sensor component can be one of various types of proximity sensors, such as but not limited to, capacitive, magnetic, inductive, optical/photoelectric, laser, acoustic/sonic, radar-based, Doppler-based, thermal, and radiation-based proximity sensors.

Other user input devices 110 may include a video input component such as an optical sensor, another audio input component such as a microphone, and a mechanical input component such as button or key selection sensors, touch pad sensor, touch screen sensor, capacitive sensor, motion sensor, and switch. Similarly, the other components 111 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

The other components 111 may include, but are not limited to, accelerometers, touch sensors, surface/housing capacitive sensors, audio sensors, and video sensors (such as a camera). For example, an accelerometer may be embedded in the electronic circuitry of the communication device 100 to show vertical orientation, constant tilt and/or whether the device is stationary. Touch sensors may used to indicate whether the device is being touched at side edges 130,131, thus indicating whether or not certain orientations or movements are intentional by the user. The other components 111 of the electronic device can also include a device interface to provide a direct connection to auxiliary components or accessories for additional or enhanced functionality and a power source, such as a portable battery, for providing power to the other internal components and allow portability of the communication device 100.

It is to be understood that FIG. 1 is provided for illustrative purposes only and for illustrating components of one communication device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

As noted above, in one embodiment, the communication device 100 can be used to make a telephone call to a profile of the communication device 100 corresponding to a third party by pointing the camera 129, for example, toward a picture of the third party or any other image associated with the third party. In one embodiment, a user icon can appear on the display 102, thereby providing an option for a user to initiate the call if the image being displayed in the camera preview matches a profile stored within the memory 118 of the communication device 100. In another embodiment, the call is automatically initiated. Either embodiment makes the calling experience extremely easy for new users. The calling experience is simplified as a user merely points the camera 129 toward an object associated with a profile of the communication device 100 to place a call. This eliminates the need for the user to sort through profiles of the communication device 100. Instead, the user can simply view an object with the camera 129 to place a call.

In another embodiment, when an image being previewed by the camera 129 includes a plurality of people, the one or more processors 116 of the communication device can automatically initiate a conference call for all people shown in the image that are associated with a profile known by the communication device 100. Turning now to FIGS. 2-12, examples of some of the various embodiments will be provided.

Figure 2:
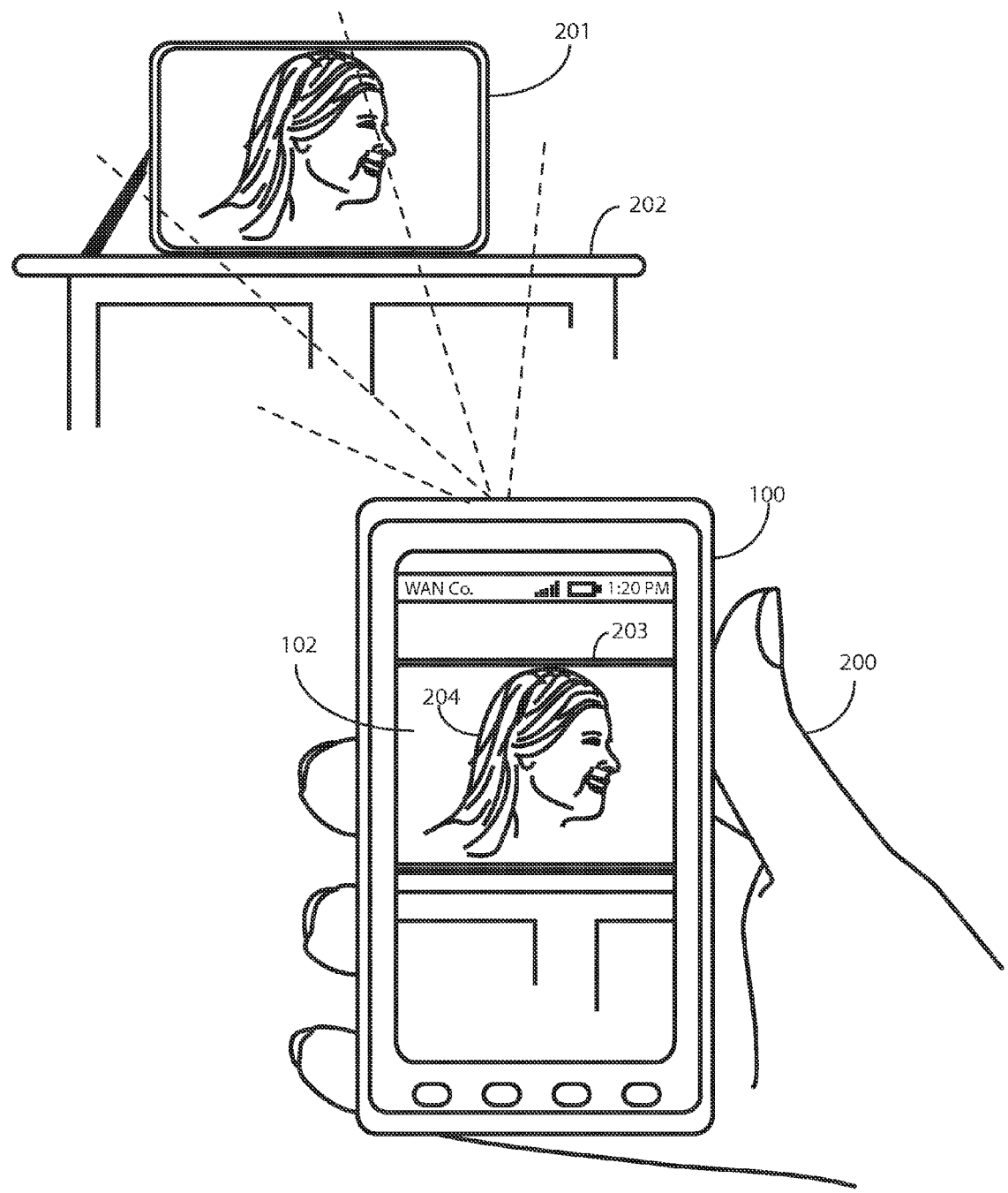
FIG. 2 illustrates one or more steps of an explanatory method in accordance with one or more embodiments of the disclosure.

Beginning with FIG. 2, a user 200 is holding a communication device 100 with the camera (129) pointed toward a picture 201 sitting on a table. The one or more processors (116) of the communication device 100 are receiving an image 203 of the picture 201 being previewed by the camera (129). The one or more processors (116) of the communication device 100 present the image 203 being previewed by the camera (129) on the display 102. The image 203 being previewed by the camera (129) in this illustrative embodiment comprises an imaged photograph of a person.

In this illustrative embodiment, the principle object 204 of the image 203 is a person. As will be described in more detail below, in other embodiments the object 204 of the image 203 can be completely dissociated with, non-representational of, or notional of, a third party. However, in this embodiment, the object 204 of the image 203 is actually a photograph of a third party. The third party, i.e., the person, may be a friend, acquaintance, relative, or other relation to the user 200.

Figure 3:
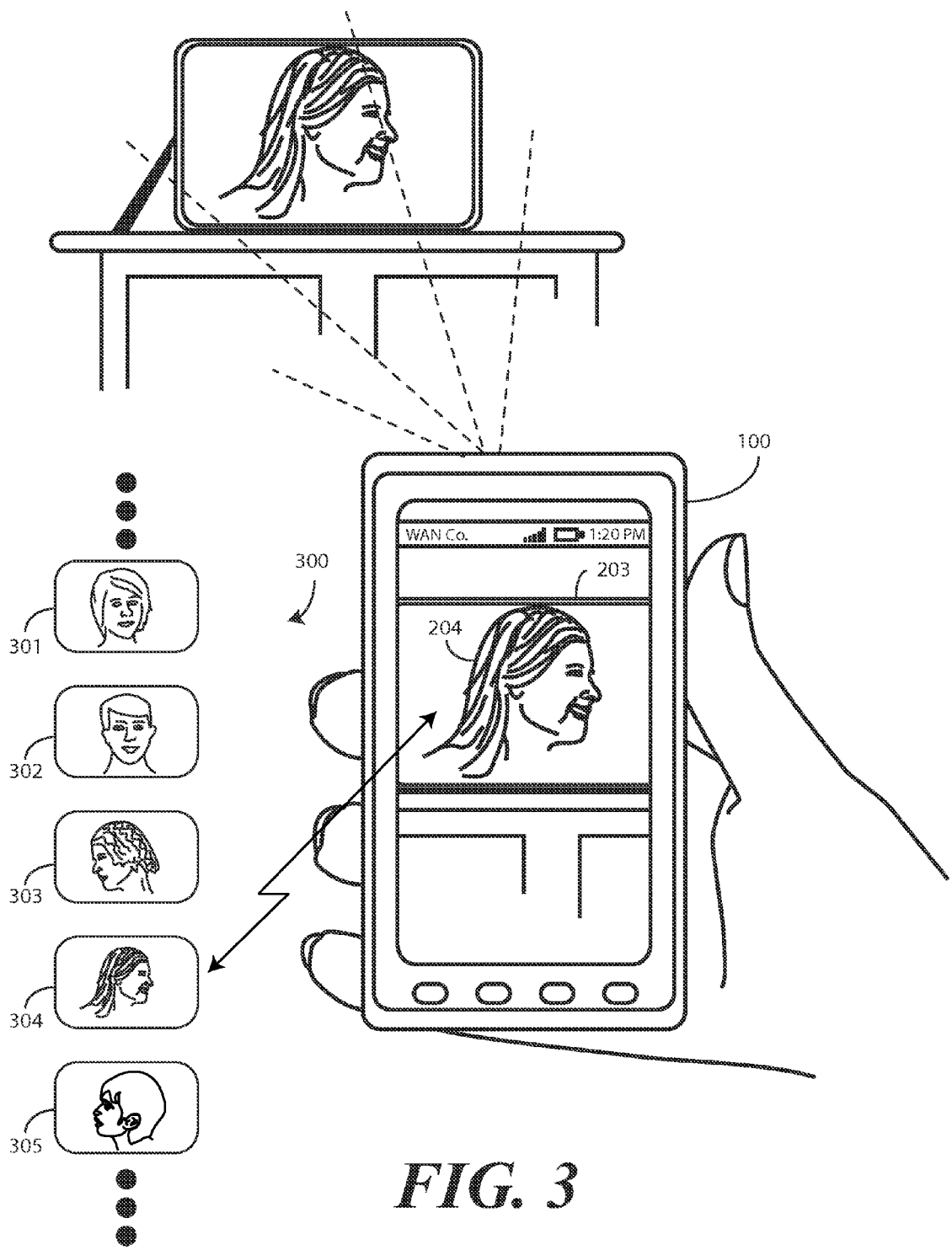
FIG. 3 illustrates one or more steps of an explanatory method in accordance with one or more embodiments of the disclosure.

Turning to FIG. 3, the one or more processors (116) of the communication device 100 are to determine whether the image 203 being previewed by the camera (129) corresponds to a stored image of one or more reference images 300 stored in the memory (118) of the communication device 100. In this embodiment, a sample set of the one or more references 300 is shown for illustration. The sample set of images includes five stored images 301,302,303,304,305. Each of the stored images 301,302,303,304,305 in this illustrative embodiment is of a person.

The one or more processors (116), in one embodiment, determine if one of the persons in the stored images 301, 302,303,304,305 substantially corresponds 306 or matches the object 204 present in the image 203. In one embodiment, the one or more processors (116) determine whether the image 203 being previewed by the camera (129) corresponds to the stored image 304 when an object 204 is present in both the image 203 being previewed by the camera (129) and the stored image 304.

In one embodiment, the one or more processors (116) employ a puzzle library to compare the stored images 301,302,303,304,305 to determine if they are of the same object 204. The one or more processors (116) can use the puzzle library to quickly find visually similar images, even if they have been resized, recompressed, recolored, or slightly modified. The puzzle library requires very little space in the memory (118). The puzzle library is very fast, readily configurable, and easy to use. In this case, the image 203 being previewed by the camera (129) substantially corresponds to stored image 304.

Figure 4:
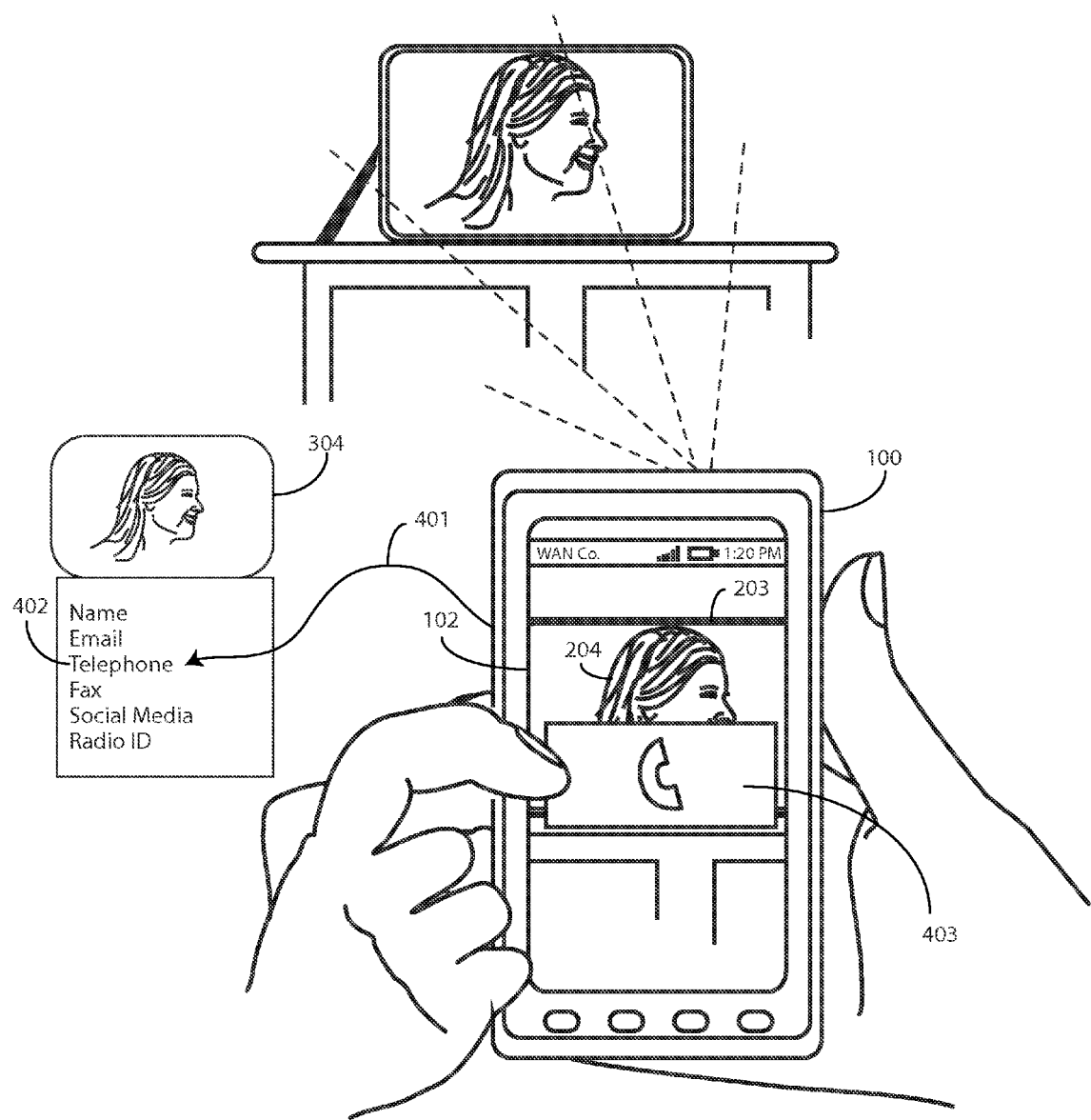
FIG. 4 illustrates one or more steps of another explanatory method in accordance with one or more embodiments of the disclosure.

Turning now to FIG. 4, where the image 203 being previewed by the camera (129) corresponds (306) to a stored image 304, the one or more processors (116) of the communication device 100 determine 401 a communication identifier 402 associated with the stored image 304. In this illustrative embodiment, the communication identifier 402 comprises a telephone number. However, it should be noted that the communication identifier 402 can take a variety of forms. Illustrating by example, in one embodiment the communication identifier 402 comprises an email address. In another embodiment, the communication identifier 402 comprises a fax number. In another embodiment, the communication identifier 402 comprises a social media identifier. Other communication identifiers will be obvious to those of ordinary skill in the art having the benefit of this disclosure. For example, a non-traditional communication identifier may be a short-wave radio address, and so forth.

In one or more embodiments, the communication identifier 402 selected is user configurable. For example, in one embodiment the user 200 can set a flag in the settings of the communication device 100 so that the one or more processors (116) of the communication device 100 always determine a particular type of communication identifier, such as a text message address, when determining the communication identifier 402 associated with the image 203 being previewed by the camera (129) on the display 102. In another embodiment, where there are multiple communication identifiers, the user can be prompted on the display 102 regarding which communication identifier they would like to select. In still other embodiments, the communication identifier 402 that the one or more processors (116) should select is set by the manufacturer and is not user selectable.

In one embodiment, where the image 203 being previewed by the camera (129) on the display 102 corresponds to a particular stored image 304, the one or more processors (116) can automatically initiate communication with a remote device using the communication identifier 402. In another embodiment, the user can deliver voice commands to initiate communication with a remote device using the communication identifier 402. In yet another embodiment, which is illustrated in FIG. 4, the one or more processors (116) of the communication device 100 present a user actuation target 403 on the display 102.

The presentation of the user actuation target 403 is helpful in that it provides an indication to the user 200 that a substantial match has been determined between the object 204 of the image 203 and one of the stored images. In the illustrative embodiment of FIG. 4, the user actuation target 403 comprises a large, green box with a white telephone illustration disposed thereon. Other appearances of the user actuation target 403 will be obvious to those of ordinary skill in the art having the benefit of this disclosure.

In one embodiment, the one or more processors (116) are to initiate communication with a remote device using the communication identifier 402 when a substantial match has been determined between the object 204 of the image 203 and one of the stored images. As noted above, this initiation of communication can be automatic, i.e., with no additional user input, in response to voice commands, or in response to touch input at a user actuation target 403. Other methods of initiating communication will be obvious to those of ordinary skill in the art having the benefit of this disclosure. For example, where the communication device 100 includes a gesture sensor, detection of user gestures can be used to initiate the communication.

Where the communication identifier 402 is a telephone number, the one or more processors (116) of the communication device (100) can initiate a telephone call with a communication device responsive to the communication identifier. Similarly, where the communication identifier is, for example, an email address, the one or more processors (116) of the communication device 100 can send a predefined email to the email address. In one embodiment, the predefined email may state, "please call me," or "I would like to speak with you. Would you mind calling?"

Figure 5:
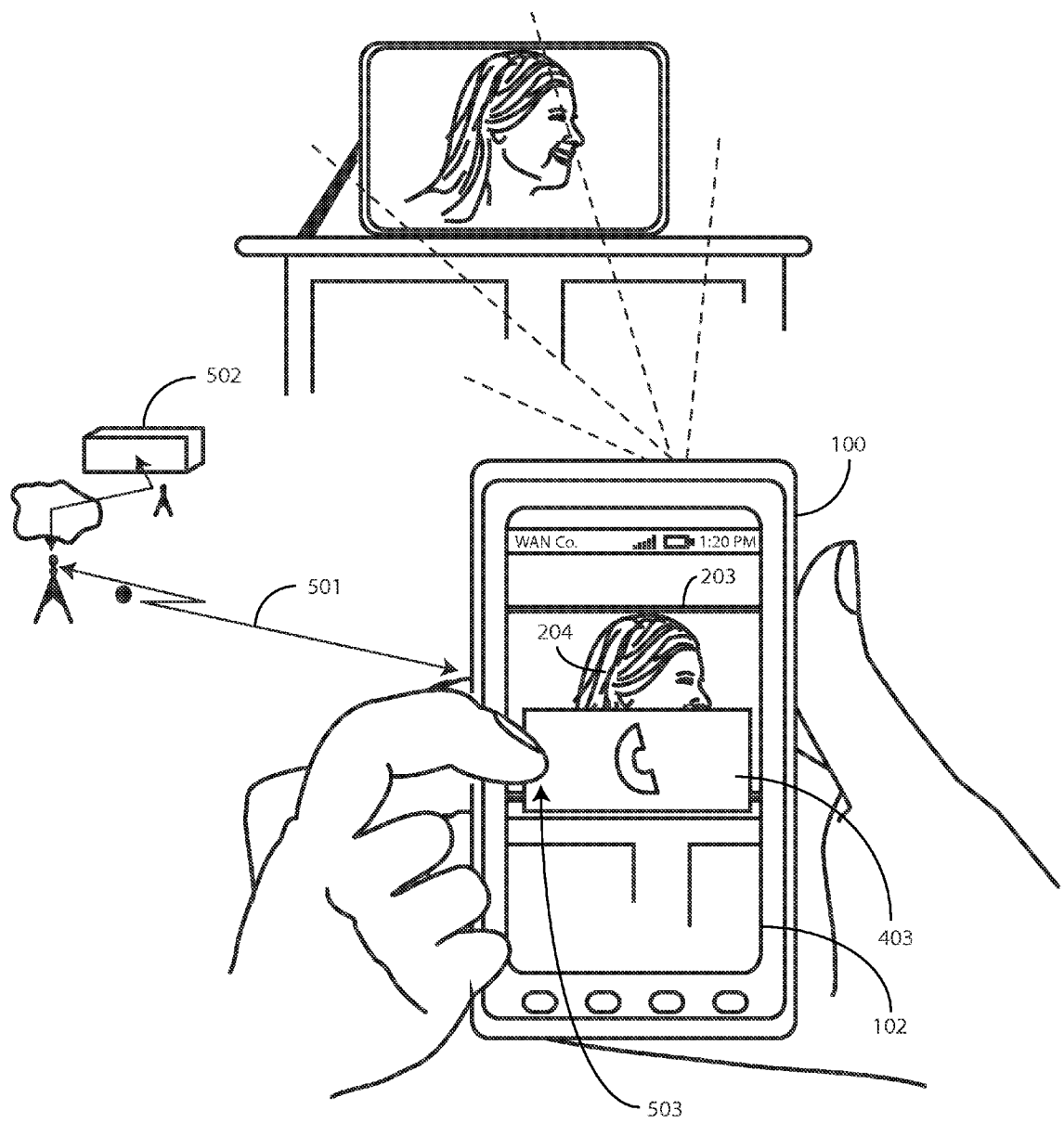
FIG. 5 illustrates one or more steps of another explanatory method in accordance with one or more embodiments of the disclosure.

Turning now to FIG. 5, the initiation of communication in a variety of ways. In one embodiment, communication 501 with a remote device 502 can be initiated automatically. Said differently, where a substantial match has been determined between the object 204 of the image 203 and one of the stored images, the one or more processors (116) of the communication device 100 can initiate communication 501 with the remote device 502 without any other additional input from the user 200. In another embodiment, when a substantial match has been determined between the object 204 of the image 203 and one of the stored images, the one or more processors (116) of the communication device can initiate a timer. Provided that the image 203 is previewed for an amount of time exceeding the timer's expiration, such as five seconds, the one or more processors (116) of the communication device 100 can initiate communication 501 with the remote device 502 upon expiration of the timer.

In the illustrative embodiment of FIG. 5, the one or more processors (116) of the communication device 100 are responsive to user interaction with the user actuation target 403. Specifically, as shown in FIG. 5, in one embodiment when a substantial match has been determined between the object 204 of the image 203 and one of the stored images, and the user actuation target 403 is present on the display 102, the one or more processors (116) initiate the communication 501 with the remote device 502 using the communication identifier (402) in response to user input 503 received at the user actuation target 403. Here, the user input 503 comprises touch input along the user actuation target 403.

Figure 6:
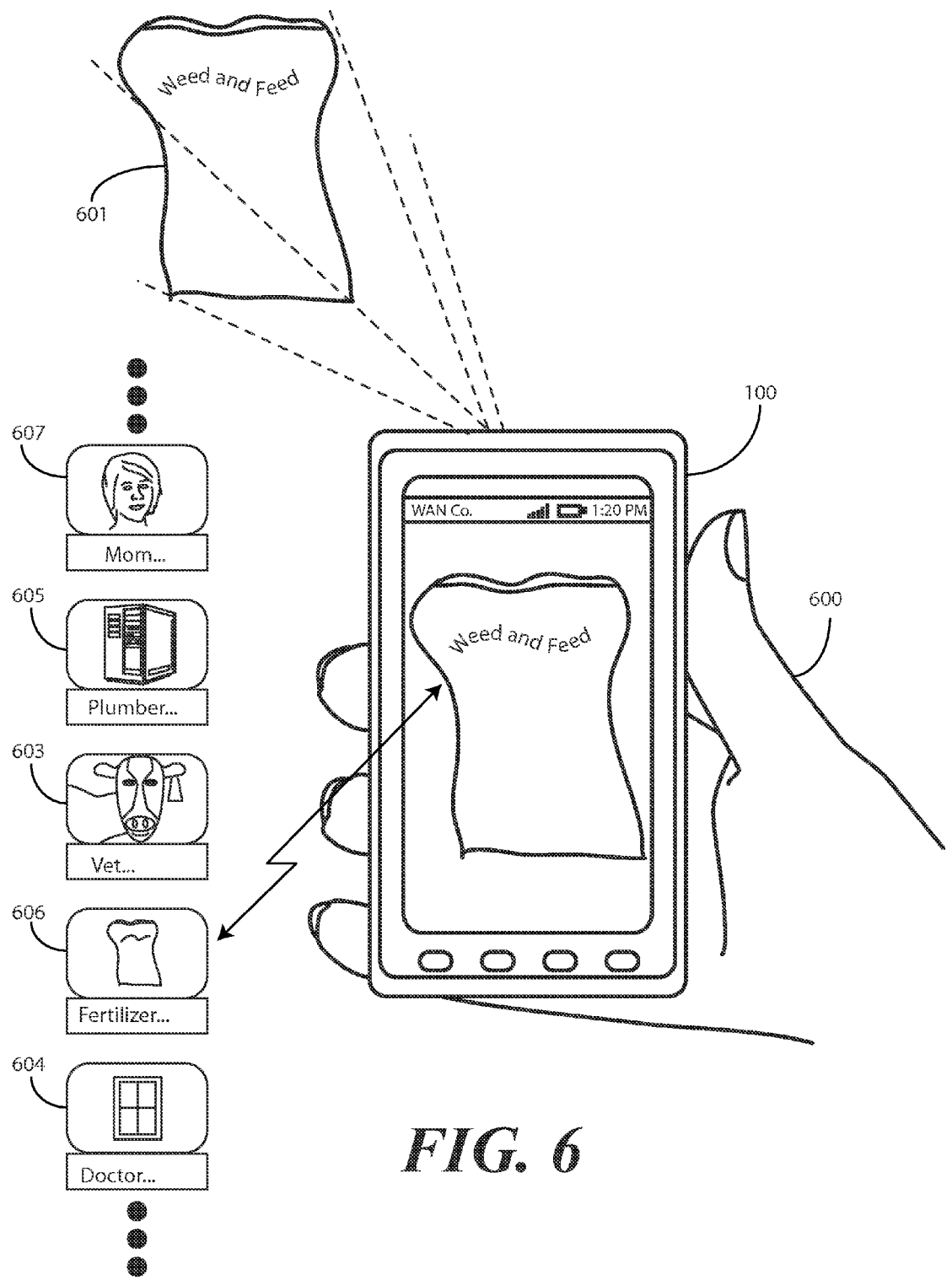
FIG. 6 illustrates one or more steps of another explanatory method in accordance with one or more embodiments of the disclosure.

In the previous example, the image 203 being previewed by the camera (129) on the display 102 comprised an imaged photograph of a person. Similarly, each of the stored images 301,302,303,304,305 was that of a person. It should be noted that embodiments of the disclosure are not so limited. As briefly mentioned above, some people may not have pictures of each and every third party they may need to call on a regular basis. Further, some people may not have pictures at all. To allow such users to take advantage of embodiments of the disclosure, other types of images can be used to initiate communication as well. Turning now to FIG. 6, illustrated therein are a few such examples.

As shown in FIG. 6, a user 600 is holding a communication device 100 with the camera (129) pointed toward an object 601. The object 601 here is a bag of fertilizer. The bag of fertilizer is used to demonstrate an example of a notional object corresponding to a third party. As used herein, a "notional" object is an object existing as a suggestion or idea of a particular third party. In one embodiment, a notional object serves as a mnemonic device of a particular third party.

In this particular embodiment, the bag of fertilizer is an inanimate object. However, within the communication device 100, this inanimate object is associated with an entity. Where, for example, the user 600 is a farmer, the inanimate bag of fertilizer may be a notional representation of an entity that is a farm supply store. Accordingly, previewing the bag of fertilizer can work to cause the one or more processors (116) of the communication device to call the farm supply store so that the farmer, i.e., user 600, can order more fertilizer.

Another notional representation of an entity is provided in FIG. 6, this time by an animate object. As shown at profile 603, a cow provides a notional representation of a veterinarian. Accordingly, previewing a cow with the camera (129) of the communication device 100 can cause the one or more processors (116) of the communication device 100 to initiate communication with a veterinarian.

In one or more embodiments, the object associated with a particular person, entity, or third party is a user definable symbol. Illustrating by example, at profile 604, a window has been associated with the user's doctor. The window constitutes a user definable symbol that is dissociated from the entity it represents. A window, generally, has nothing to do with a doctor. However, for a user 600 with few belongings, or a bedridden user, being able to define a window as corresponding to a doctor allows the user 600 to operate the need of pictures, frames, tables, or in fact, any belongings whatsoever. So long as the user 600 remembers that previewing the window will initiate communication with the doctor, the user 600 is able to take the same advantage of embodiments of the disclosure as is the wealthiest user with the most pictures.

Another example of a user definable symbol dissociated from the entity to which it corresponds is shown at profile 605. A computer, which the user 600 in a store window, has been used to correspond to a plumber. Computers are clearly dissociated from plumbers. However, the user definability of symbols for communication initiation provided by embodiments of the disclosure make such an image perfectly suitable for calling a plumber. By contrast to the notional representations set forth in profiles 603,606, and the dissociated representations set forth in profiles 604,605, the symbol used in profile 607 is an image of an actual person as described above with reference to FIGS. 2-5.

Figure 8:
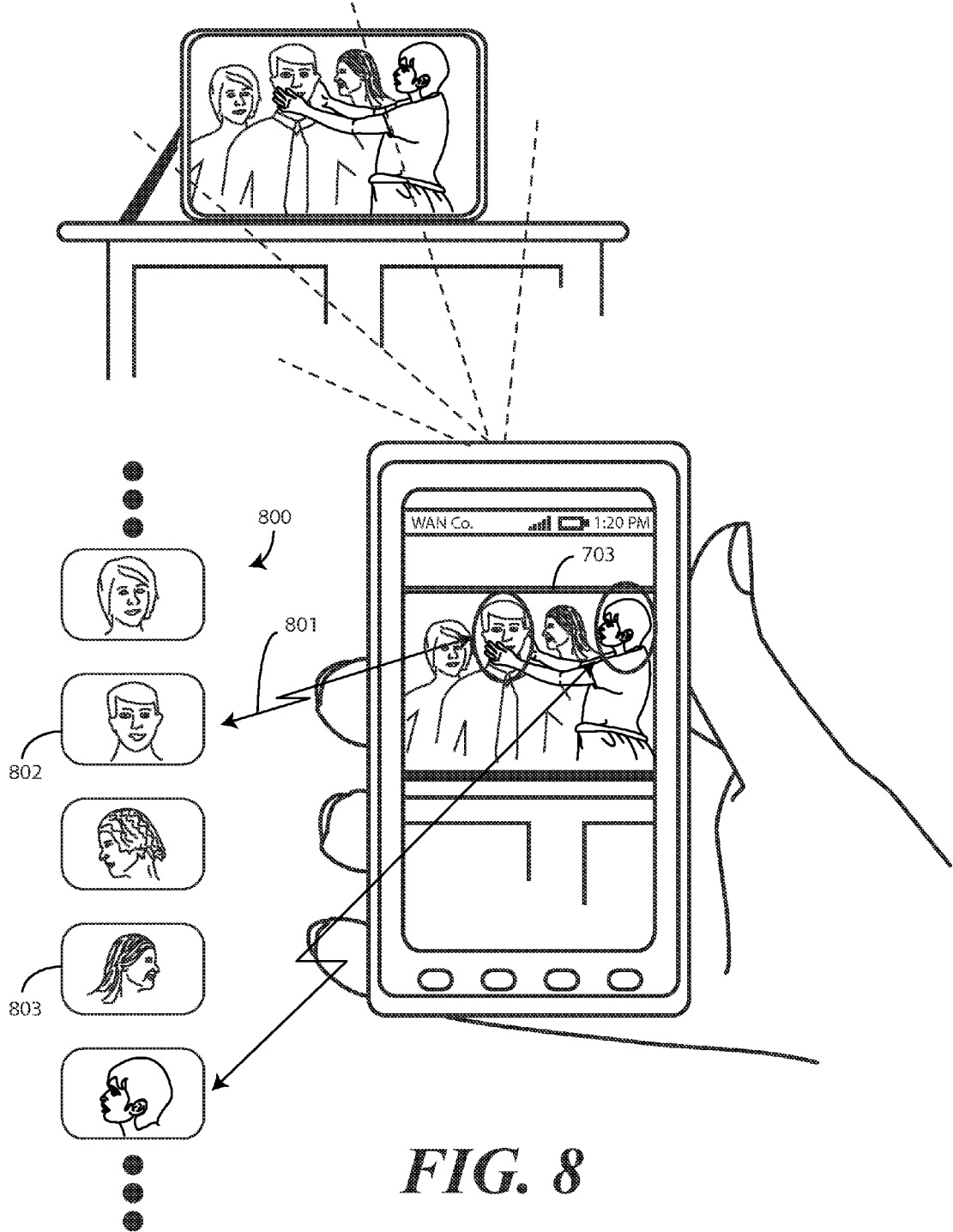
FIG. 8 illustrates one or more steps of another explanatory method in accordance with one or more embodiments of the disclosure.
Figure 9:
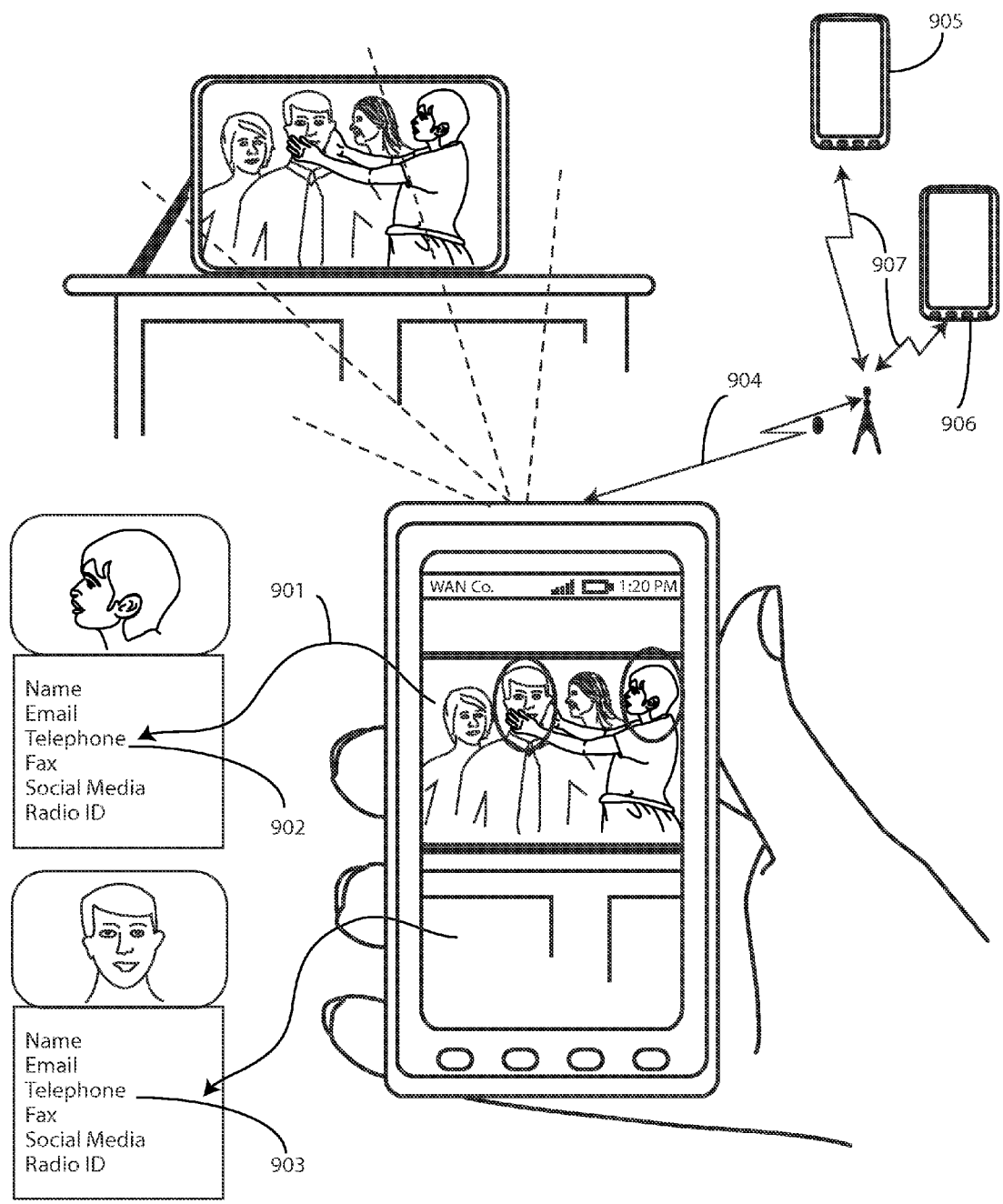
FIG. 9 illustrates one or more steps of another explanatory method in accordance with one or more embodiments of the disclosure.

Another advantage of embodiments of the disclosure is the ability to simply and efficiently initiate group communications such as conference calls, group messages, group emails, and so forth. This embodiment is illustrated in FIGS. 7-9.

Figure 7:
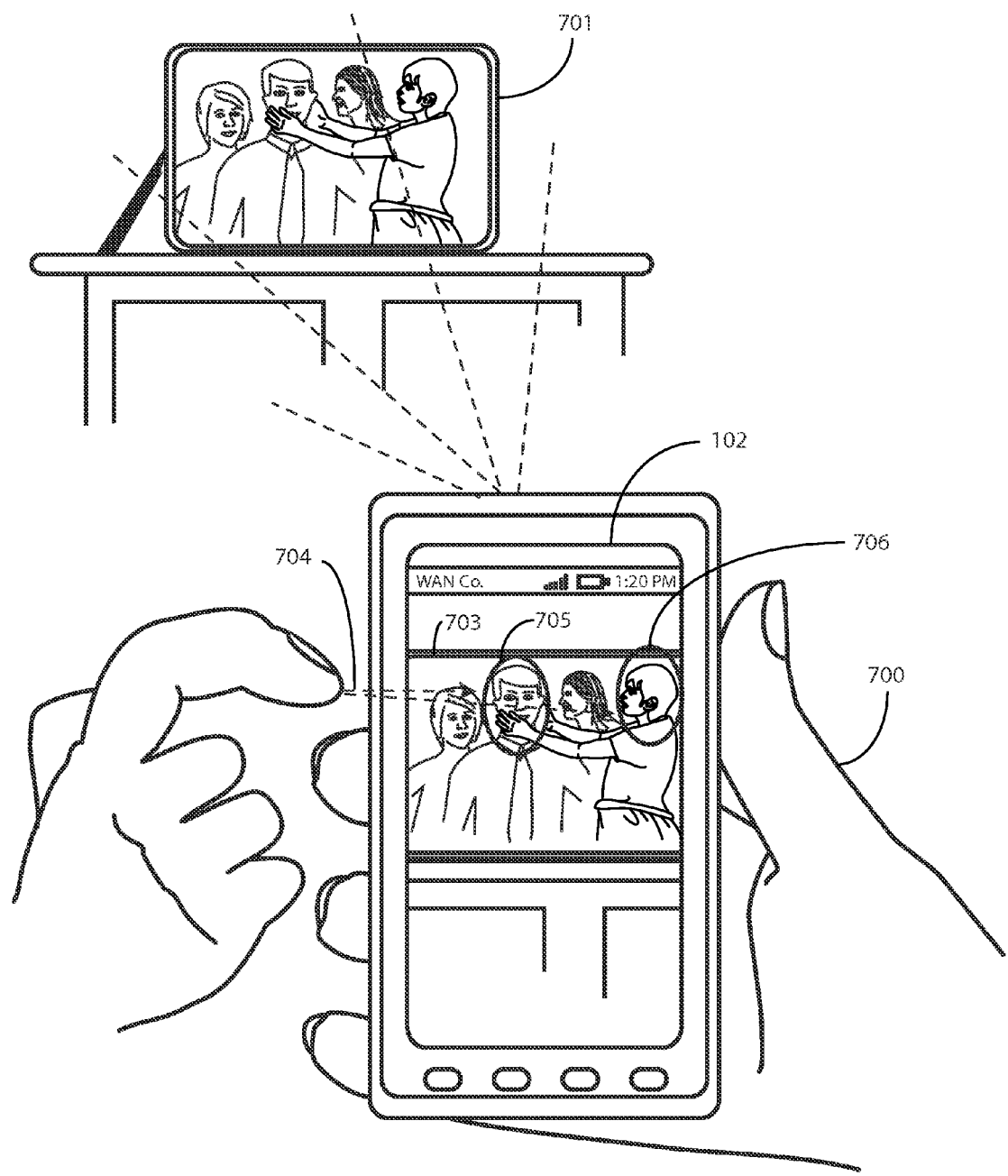
FIG. 7 illustrates one or more steps of another explanatory method in accordance with one or more embodiments of the disclosure.

Beginning with FIG. 7, a user 700 is holding a communication device 100 with the camera (129) pointed toward a picture 701 sitting on a table. The one or more processors (116) of the communication device 100 are receiving an image 703 of the picture 701 being previewed by the camera (129). The one or more processors (116) of the communication device 100 present the image 703 being previewed by the camera (129) on the display 102. The image 703 being previewed by the camera (129) in this illustrative embodiment comprises an imaged photograph of a plurality of people.

In this illustrative embodiment, while an image 203 of multiple people is present on the display, the user 700 is optionally allowed to select 704 one or more portions 705,706 of the image 703 to select a subset of the plurality of people. In this illustrative embodiment, the first portion 705 corresponds to a very dear friend named Buster, while portion 706 corresponds to another dear friend named Kayla. By touching the images of their faces, the user 700 has selected Buster and Kayla by selecting portions 705,706 of the image 703.

In one embodiment, the one or more processors (116) are configured to use only the portions 705,706 of the image that were selected 704 by the user 700 to determine whether the image 703 being previewed by the camera (129) on the display 102 corresponds to one or more stored images of the communication device. Where looking for substantial similarity of actual representations of an entity, the one or more processors (116) of the communication device 100 in this embodiment check to see if the faces of Buster and Kayla substantially match stored images of profiles of the communication device 100. Said differently, the one or more processors (116) of the communication device 100 receive a user election of one or more objects of the image 703 being previewed by the camera (129) on the display 102, e.g., Buster and Kayla in this example. The one or more processors (116) of the communication device 100 then determine whether the image 703 corresponds to one or more stored images of the communication device 100 by determining whether one or both of these objects is present in a stored image of a stored profile. This is shown in FIG. 8.

Turning now to FIG. 8, the one or more processors (116) of the communication device 100 determine 801 whether the image 704 being previewed by the camera (129) corresponds to one or more stored images 800 by determining, for each object, whether the object is present in a stored image. Here, Buster and Kayla correspond to profiles 802,803.

Thus, profiles 802,803 constitute a plurality of stored images corresponding to the plurality of objects obtained by the determining step.

Turning now to FIG. 9, the one or more processors (116) of the communication device 100 determine 801, for each image of the plurality of stored images where there was a substantial match, the communication identifier 902,903 associated with the each image of the plurality of stored images to obtain a plurality of communication identifiers. The one or more processors (116) of the communication device 100 then initiate communication 904 by initiating a conference call 907 to a plurality of devices 905,906 using the plurality of communication identifiers.

As noted above with reference to FIG. 5, the conference call 907 (or alternatively other group communication such as a group email, group text message, or group multimedia message) can be initiated in a variety of ways. In the illustrative embodiment of FIG. 9, the one or more processors (116) of the communication device 100 automatically initiate the conference call 907 after receiving the user selection of the subset as described above with reference to FIG. 7. In another embodiment, where the optional user selection is omitted, the one or more processors (116) of the communication device 100 may automatically initiate the conference call 907 with all persons in the image 703 that correspond to profiles stored within the memory (118) of the communication device.

In another embodiment, when a substantial match has been determined between the either the subset of persons (where the user selection is provided) or all persons of the image 703 and one of the stored images, the one or more processors (116) of the communication device 100 can initiate a timer. Provided that the image 703 is previewed for an amount of time exceeding the timer's expiration, such as five seconds, the one or more processors (116) of the communication device 100 can initiate the conference call 907 upon expiration of the timer. In another embodiment, as described above with reference to FIGS. 4-5, the one or more processors (116) of the communication device 100 can be responsive to user interaction with a user actuation target to initiate the conference call 907.

Figure 10:
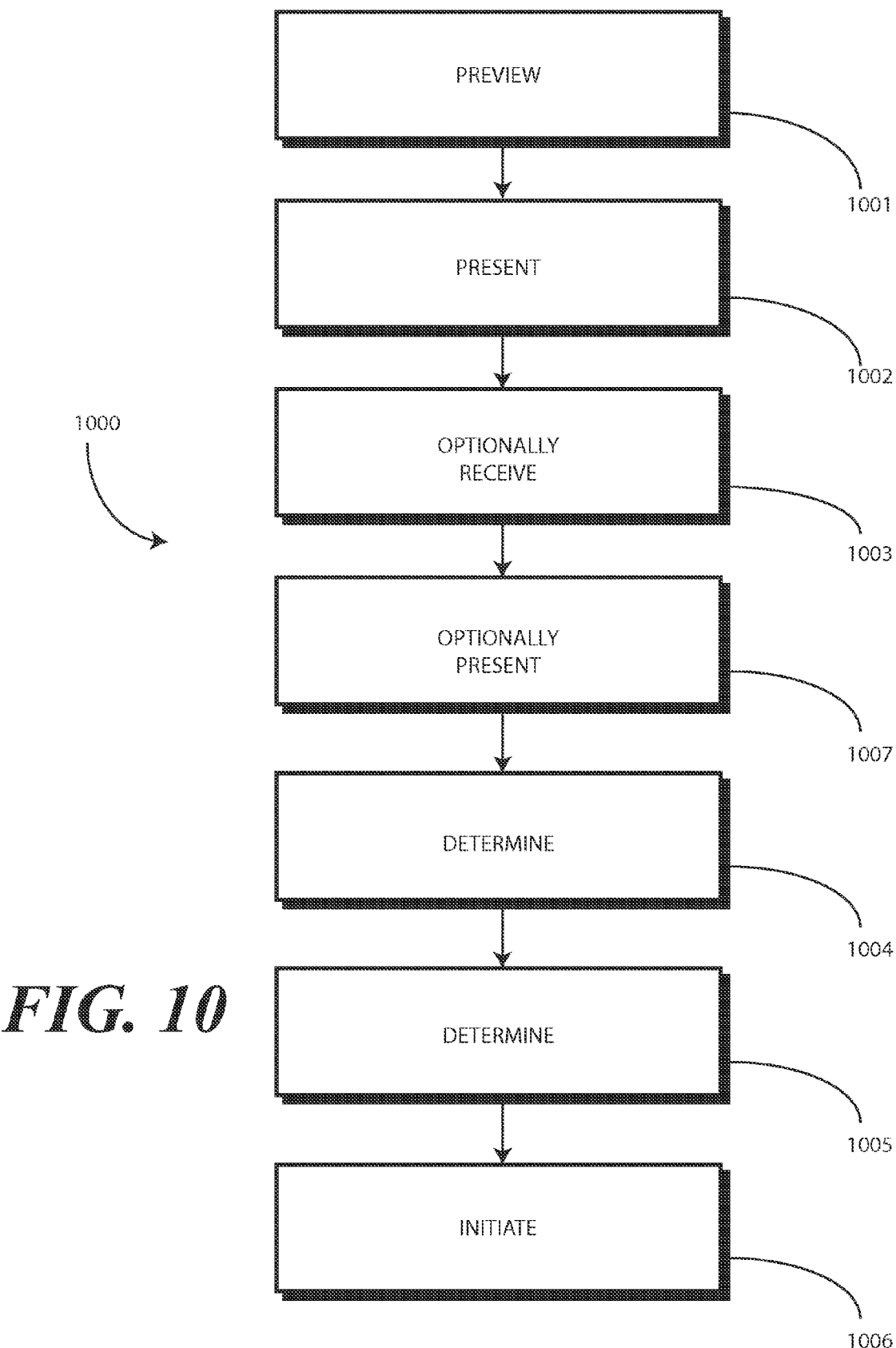
FIG. 10 illustrates one or more steps of another explanatory method in accordance with one or more embodiments of the disclosure.

Turning now to FIG. 10, illustrated therein is an explanatory method 1000 suitable for use with a communication device in accordance with one or more embodiments of the disclosure to initiate group communications. Many of the steps of the method 1000 have been substantially described above, and will therefore be only cursorily described with reference to FIG. 10.

At step 1001, the method 1000 previews, with an imager, an image. At step 1002, the method 1000 presents, with one or more processors, the image on a user interface of a communication device.

At step 1003, the method 1000 optionally receives, at the user interface, a selection of a plurality objects of the image. In other embodiments, this step 1003 is omitted.

At step 1004, the method 1000 determines, with the one or more processors, whether an object of the plurality of objects of the image is present in a stored image of a plurality of stored reference images. In one embodiment, the method 1000 repeats this step 1004 for each object of the plurality of objects of the image to obtain a plurality of matching stored images. Where step 1003 is omitted, the method 1000 would repeat step 1004 for each object of the image. As noted above, the object can be an actual representation of an entity, a notional representation of an entity, or a dissociated representation of an entity. The entity can be any of a person, a business, a service provider, a healthcare service provider, or other entity.

At step 1005, the method 1000 determines a communication identifier for each matching stored image of the plurality of matching stored images to obtain a plurality of communication identifiers. At step 1006, the method 1000 initiates a group communication using the plurality of communication identifiers. Step 1006 can be automatic, in response to user input or confirmation, or otherwise in one or more embodiments. The group communication initiated in step 1006 one or more of a group electronic mail, group text message, group multimedia message, group conference call, group video conference call, or group social media post. Where step 1006 occurs in response to user input, optional step 1007 can include presenting a user actuation target on the user interface after the repeating and receiving, at the user interface, user input at the user actuation target.

Figure 11:
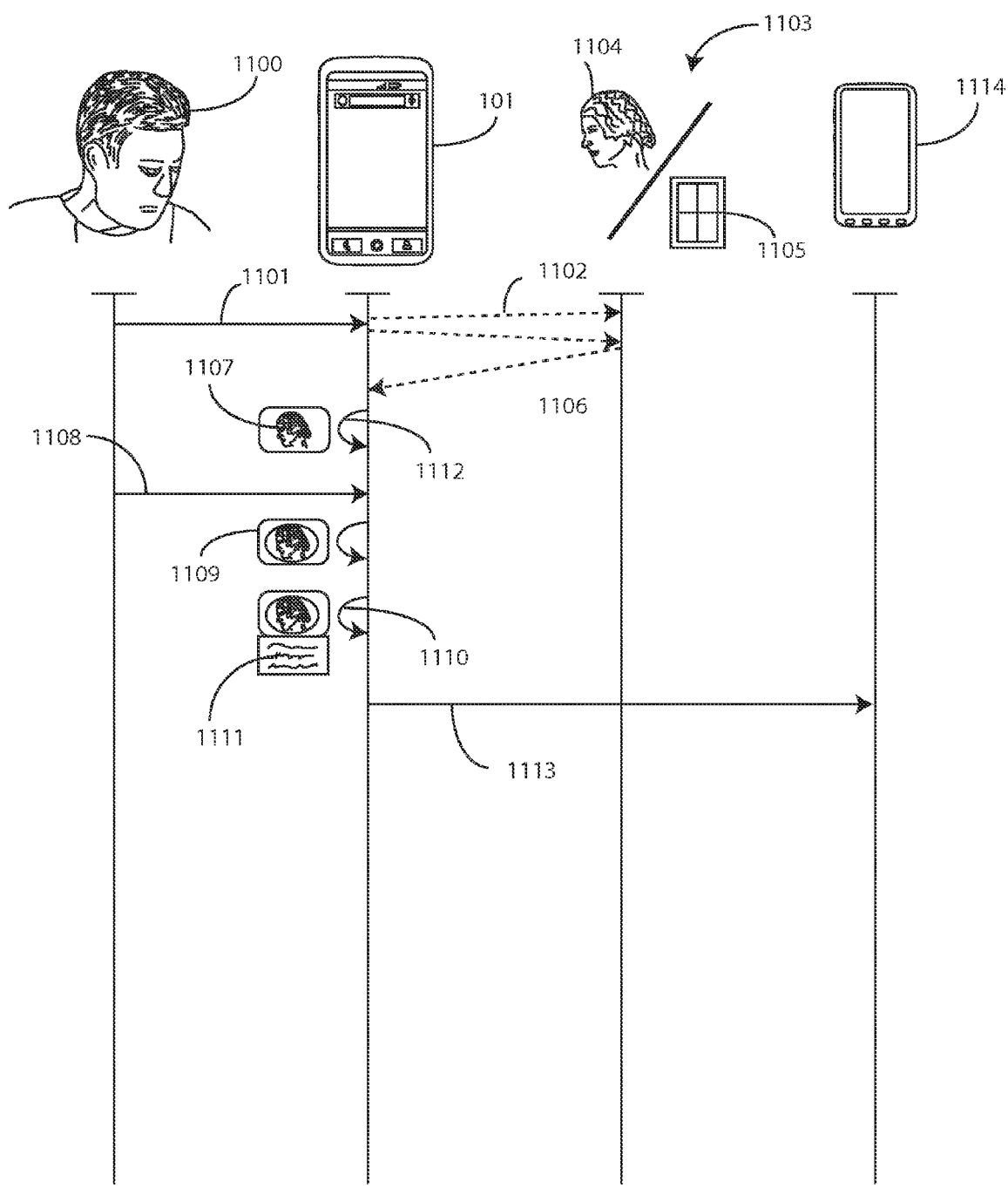
FIG. 11 illustrates an explanatory system flow diagram in accordance with one or more embodiments of the disclosure.

Turning now to FIG. 11, illustrated therein is a system and flow diagram of one or more embodiments of the disclosure. A communication device 100 includes a communication circuit, an imager, one or more processors operable with the communication circuit and the imager, and one or more memory devices operable with the one or more processors. The one or more memory devices to store one or more reference images.

A user 1100 interacts 1101 with the communication device 100 so that the imager is aimed 1102 at an object 1103. The object 1103 can be an actual representation 1104 of an entity, a notional representation of an entity, or a dissociated representation 1105 of an entity.

The imager is placed in a preview mode to preview the object 1103. The one or more processors receive 1106 an image being previewed by the imager. The one or more processors then determine 1112 whether the image being previewed by the imager corresponds to a stored image 1107 of the one or more reference images stored in the memory. The one or more processors can optionally receive 1108, from the user interface of the communication device 100, a user selection of a portion 1109 of the image, and can optionally use only the portion 1109 of the image to determine whether the image being previewed by the imager corresponds to the stored image 1107.

Where the image being previewed by the imager corresponds to the stored image 1107, the one or more processors can determine 1110 a communication identifier 1111 associated with the stored image 1107. The one or more processors can then initiate 1113 communication with a remote device 1114 using the communication identifier 1111.

Figure 12:
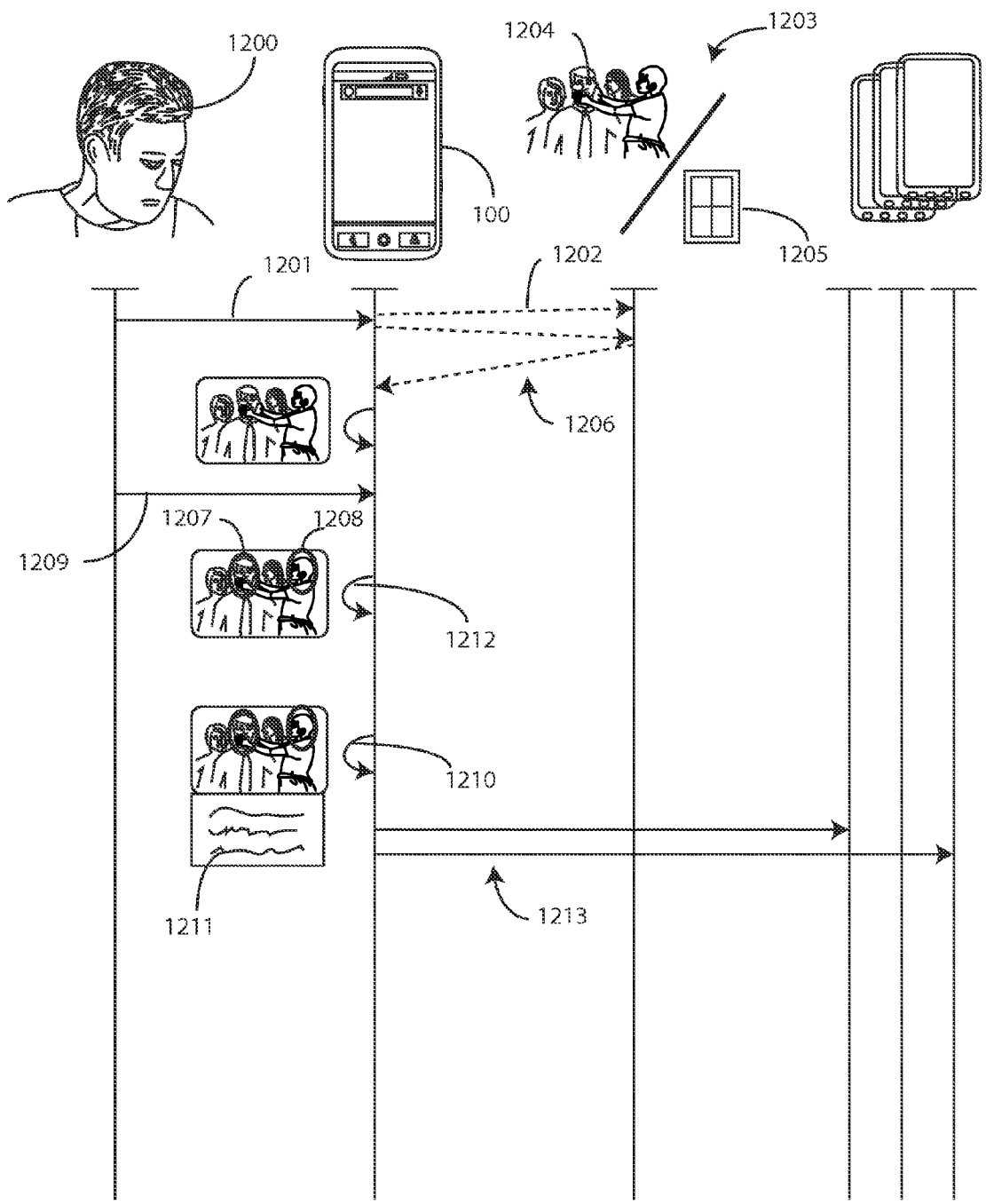
FIG. 12 illustrates another explanatory system flow diagram in accordance with one or more embodiments of the disclosure.

Turning now to FIG. 12, illustrated therein is a system and flow diagram of one or more embodiments of the disclosure. A communication device 100 includes a communication circuit, an imager, one or more processors operable with the communication circuit and the imager, and one or more memory devices operable with the one or more processors. The one or more memory devices to store one or more reference images.

A user 1200 interacts 1201 with the communication device 100 so that the imager is aimed 1202 at an object 1203. The object 1203 can be a plurality of actual representations 1204 of a plurality of entities, a plurality of notional representations of entities, or a plurality of dissociated representations 1205 of an entity.

The imager is placed in a preview mode to preview the plurality of objects 1203. The one or more processors receive 1206 an image being previewed by the imager. The one or more processors then determine 1212 whether an object 1207,1208 of the plurality of objects of the image is present in a stored image of a plurality of stored reference images. The objects 1207,1208 can be selected by the user 1200 via user input 1209. This can be repeated for each object of the plurality of objects of the image to obtain a plurality of matching stored images.

Once all objects 1207,1208 have been matched, the one or more processors can determine 1210 a communication identifier 1211 for each matching stored image of the plurality of matching stored images to obtain a plurality of communication identifiers. The one or more processors can then initiate a group communication 1213 using the plurality of communication identifiers.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A communication device, comprising:
   a camera;
   a touch-sensitive display;
   one or more processors; and
   one or more memory devices operable to store contact information, a profile entry of the contact information comprising a reference image associated with an entity and a communication identifier associated with the entity,
   wherein the one or more processors are operable to:
      responsive to receiving an image being previewed by the camera, output, for display by the touch-sensitive display, the image being previewed by the camera;
      receive, from the touch-sensitive display, an indication of a user input detected by the touch-sensitive display, the user input to select a portion of the image being previewed by the camera;
      responsive to receiving the indication of the user input:
         compare an object within the portion of the image being previewed by the camera to an object within the reference image associated with the entity;
         determine, based on the comparison, whether the portion of the image being previewed by the camera corresponds to the entity; and
         responsive to determining that the portion of the image being previewed by the camera corresponds to the entity, initiate, using the profile entry, communication with a remote device associated with the entity.

2. The communication device of claim 1, wherein the one or more processors are further operable to:
   responsive to determining that the portion of the image being previewed by the camera corresponds to the entity, output, for display by the touch-sensitive display, a user actuation target.

3. The communication device of claim 2, wherein the user input is a first user input, and wherein the one or more processors are further operable to:
   receive an indication of a second user input detected by the touch-sensitive display at a location of the touch-sensitive display at which the user actuation target is displayed; and
   initiate the communication with the remote device associated with the entity in response to receiving the indication of the second user input at the user actuation target.

4. The communication device of claim 1, wherein the object within the reference image associated with the entity is a representation of a person.

5. The communication device of claim 4, wherein the image being previewed by the camera is an imaged photograph of the person.

6. The communication device of claim 1, wherein:
   the object within the reference image associated with the entity is a representation of an inanimate object associated with the entity.

7. The communication device of claim 1, wherein the object within the reference image associated with the entity is a user definable symbol.

8. The communication device of claim 7, wherein the user definable symbol is a notional representation of the entity.

9. The communication device of claim 7, wherein the user definable symbol is dissociated from the entity.

10. The communication device of claim 1, wherein the communication identifier is an electronic mail address associated with the entity and wherein the one or more processors are operable to:
    responsive to determining that the portion of the image being previewed by the camera corresponds to the entity, output, without further user input, to the electronic mail address associated with the entity, an electronic mail that includes a predefined communication message.

11. The communication device of claim 1, wherein the user input is a first user input, wherein the portion is a first potion, and wherein the one or more processors are further operable to:
    receive, from the touch-sensitive display, an indication of a second user input detected by the touch-sensitive display, the second user input to select a second portion of the image being previewed by the camera.

12. The communication device of claim 1, wherein the communication identifier is a telephone number associated with the entity and wherein the one or more processors are further operable to:
    responsive to determining that the portion of the image being previewed by the camera corresponds to the entity, establish, without further user input, a communication session with the telephone number associated with the entity.

13. The communication device of claim 11, wherein:
    the profile entry is a first profile entry;
    the entity is a first entity;
    the contact information further includes a second profile entry that includes a reference image associated with a second entity and a communication identifier associated with the second entity; and the one or more processors are further operable to:
responsive to receiving the indication of the second user input:
compare an object within the second portion of the image being previewed by the camera to an object within the reference image associated with the second entity;
determine, based on the comparison of the object within the second portion of the image being previewed by the camera to the object within the reference image associated with the second entity, whether the second portion of the image being previewed by the camera corresponds to the second entity; and
responsive to determining that the second portion of the image being previewed by the camera corresponds to the second entity, initiate, using the second profile entry, communication with a remote device associated with the second entity.

14. The communication device of claim 13, wherein the one or more processors are further operable to:
initiate a conference call to the remote device associated with the first entity using the first profile entry and the remote device associated with the second entity using the second profile entry.

15. A method, comprising:
previewing, by a camera, an image;
outputting, by one or more processors, for display by a touch-sensitive display, the image being previewed by the camera;
receiving, by the one or more processors, from the touch-sensitive display, an indication of a user input detected by the touch-sensitive display, the user input to select a plurality of portions of the image;
responsive to receiving the indication of the user input:
comparing, by the one or more processors, for each portion of the plurality of portions, an object within a respective portion of the image being previewed by the camera to an object within a reference image associated with an entity, the reference image being included in a profile entry that includes a communication identifier associated with the entity;
determining, by the one or more processors, based on the comparison, for each portion of the plurality of portions, whether a respective portion corresponds to the entity to determine a plurality of profile entries for a group communication; and
responsive to determining the plurality of profile entries for the group communication,
initiating, by the one or more processors, using the plurality of profile entries for the group communication, the group communication.

16. The method of claim 15, wherein the group communication is one or more of a group electronic mail, group text message, group multimedia message, group conference call, group video conference call, or group social media post.

17. A communication device, comprising:
a camera;
a touch-sensitive display;
one or more processors; and
one or more memory devices being operable to store contact information, a first profile entry of the contact information comprising a reference image associated with a first entity and a communication identifier associated with the first entity and a second profile entry of the contact information comprising a reference image associated with a second entity and a communication identifier associated with the second entity,
wherein the one or more processors are operable to:
output, for display by the touch-sensitive display, an image being previewed by the camera;
receive an indication of a user input detected by the touch-sensitive display, the user input to select a first portion and a second portion of the image being previewed by the camera;
responsive to receiving the indication of the user input:
compare an object within the first portion of the image being previewed by the camera to an object within the reference image associated with the first entity;
determine, based on the comparison of the object within the first portion of the image being previewed by the camera to the object within the reference image associated with the first entity, whether the first portion of the image being previewed by the camera corresponds to the first entity;
compare an object within the second portion of the image being previewed by the camera to an object within the reference image associated with the second entity;
determine, based on the comparison of the object within the second portion of the image being previewed by the camera to the object within the reference image associated with the second entity, whether the second portion of the image being previewed by the camera corresponds to the second entity; and
initiate, using the first profile entry and the second entry, communication with a plurality of remote devices.

18. The communication device of claim 17, wherein:
the communication identifier associated with the first entity and the communication identifier associated with the second entity are telephone numbers, and
the communication with the plurality of remote devices is a conference call.

* * * * *